US006751834B2

United States Patent
Gordon

(10) Patent No.: US 6,751,834 B2
(45) Date of Patent: Jun. 22, 2004

(54) AUTOMATIC JACKETING OF A CABLE

(75) Inventor: Steven J. Gordon, Weston, MA (US)

(73) Assignee: Brooks Automation, Inc., Chelmsford, MA (US)

(*) Notice: Subject to any disclaimer, the term of this patent is extended or adjusted under 35 U.S.C. 154(b) by 0 days.

(21) Appl. No.: 10/106,571

(22) Filed: Mar. 26, 2002

(65) Prior Publication Data

US 2002/0133939 A1 Sep. 26, 2002

Related U.S. Application Data

(60) Provisional application No. 60/278,586, filed on Mar. 26, 2001, and provisional application No. 60/278,587, filed on Mar. 26, 2001.

(51) Int. Cl.$^7$ .............................................. B23P 19/02
(52) U.S. Cl. ..................... 29/33 E; 29/33 T; 29/33 K; 29/728; 29/781; 29/234; 156/259; 156/294; 264/146
(58) Field of Search ............................. 29/33 E, 33 D, 29/33 T, 33 K, 33.52, 728, 234, 745, 781, 235, 450; 156/244.18, 259, 294; 264/146

(56) References Cited

U.S. PATENT DOCUMENTS

| | | | |
|---|---|---|---|
| 3,175,282 A | * | 3/1965 | Meeker et al. ................. 29/404 |
| 3,795,275 A | * | 3/1974 | Bohn ........................... 29/728 |
| 4,201,607 A | * | 5/1980 | Rautenberg et al. ......... 156/259 |
| 4,212,097 A | | 7/1980 | Portinari et al. |
| 4,332,436 A | | 6/1982 | Adorni et al. |
| 4,508,423 A | | 4/1985 | Winter et al. |
| 4,593,442 A | | 6/1986 | Wright et al. |
| 4,594,765 A | * | 6/1986 | Kinnear ........................ 29/235 |
| 4,620,412 A | | 11/1986 | Portinari |
| 4,741,470 A | | 5/1988 | Winter et al. |
| 4,759,487 A | | 7/1988 | Karlinski |
| 4,844,762 A | * | 7/1989 | Schroder ............... 156/244.18 |
| 4,896,997 A | * | 1/1990 | Gaylin ......................... 29/450 |
| 5,027,864 A | * | 7/1991 | Conti et al. ................. 174/68.3 |
| 5,087,153 A | * | 2/1992 | Washburn ................. 405/183.5 |
| 5,745,626 A | | 4/1998 | Duck et al. |

FOREIGN PATENT DOCUMENTS

DE            4039237 A1  *  6/1992

* cited by examiner

*Primary Examiner*—Erica Cadugan
(74) *Attorney, Agent, or Firm*—David D. Lowry; Rich Pickreign; Brown Rudnick Berlack Israels LLP

(57) ABSTRACT

An apparatus and method for automatically inserting a cable into a protective jacket. A longitudinal cut is made in the protective jacket and the cable is inserted into the longitudinal cut. The cable and jacket are transported through the apparatus along an arcuate guide path formed by a friction wheel.

16 Claims, 2 Drawing Sheets

AUTOMATIC JACKETING OF A CABLE

PRIORITY

The present application claims priority from U.S. patent application Ser. Nos. 60/278,586 and 60/278,587, both filed on Mar. 26, 2001 and which are incorporated herein by reference.

FIELD OF THE INVENTION

The present invention relates to the insertion of a wire, cable or fiber into a protective jacket, and more particularly to a method and apparatus for automatically inserting a wire or fiber into a protective jacket.

BACKGROUND OF THE INVENTION

As the use of the internet and other communication networks increases throughout the world, the need to transmit large quantities of information becomes particularly important. Because of its high band-width and compact size, fiber optic cable often is used to transmit a large portion of this information. Fiber optic cable is fragile and easily can suffer from physical damage or excessive bending, both of which may compromise its light transmission qualities. Accordingly, fiber optic cable often is encased in a protective sleeve or jacket. Generally, the fiber optic cable is encased in a protective sleeve when the fiber optic cable is manufactured. However, in certain cases, the fiber is not encased in a protective sleeve at the time of manufacture, and it is necessary to insert the fiber into a protective sleeve at a later time. For example, it may be more convenient to assemble a number of optical components together into a module by fusing 250 micron cable rather than 900 micron cable. At the conclusion of the assembly process, it may be desirable to jacket cables exiting the module with an auxiliary 900 micron protective sleeve.

Traditionally, an optical fiber is inserted manually into the protective sleeve. For example, U.S. Pat. No. 5,745,626 teaches to insert one or more optical fibers 10 through a bore 13 formed in a sleeve 18. However, these manual methods are extremely slow and labor intensive and limit the length of fiber that can be inserted into the sleeve. Also, these manual methods can damage or break the fiber, thereby creating inconsistent yields. Further, these manual methods cannot be used with fibers that have been terminated at both ends.

Several other methods have been used to insert a wire or cable into the protective sleeve. U.S. Pat. No. 4,332,436 teaches to insert an optical fiber within a metal tube by flowing a fluid around the fiber and through the tube, whereby the fiber is entrained within the metal tube by the flow of fluid. However, this method requires a complex device to properly deliver the flow of liquid. U.S. Pat. No. 4,593,442 teaches an apparatus that inserts a flexible cable C into a pipe P. The apparatus includes a head 18 comprising a wedge 36 that separates the pipe P and a guide 20 that guides the cable C into the pipe P. The pipe P is resilient and closes automatically as the head 18 is manually drawn by the handle 16. Because the head 18 is drawn manually, this method is tedious and slow.

Also, U.S. Pat. No. 4,212,097 teaches a tool for inserting an optical fiber into an elastomer tube. As shown in FIG. 2, the optical fiber 11 is inserted into the elastomer tube 14 by longitudinally cutting the tube 14 with cutting means 20, spreading apart the cut edges 22 and 23 with separating/guiding means 24 and inserting the fiber 11 into the tube 14. The cutting means 20 and separating/guiding means 24 are included in an assembly 16 (see FIG. 1). As shown in FIG. 1, a traction controlling device 26 is used to pull the tube 14 through the apparatus. The apparatus of U.S. Pat. No. 4,212,097 is directed towards placing a fiber into a tube which loosely encloses the fiber, and also for producing long runs of fiber inserted in the tube. The apparatus does not lend itself to short runs which require the ability to automate the process of inserting short runs of fiber into short runs of tube.

SUMMARY OF THE INVENTION

The present invention provides an apparatus and method for inserting a wire, fiber or cable into a protective sleeve. The protective sleeve is slit by a blade along the length of the sleeve and the fiber is inserted into the slit. In one embodiment, the cable and sleeve are transported through the apparatus along an arcuate guide path formed by a friction wheel.

The invention may be implemented to quickly and efficiently insert a wire or cable of any length into a protective sleeve, thereby increasing both cycle time and output yield.

The present invention can be used to insert into a protective sleeve a fiber that has been terminated at both ends.

BRIEF DESCRIPTION OF THE DRAWINGS

The foregoing and other features and advantages of the present invention will be more fully understood from the following detailed description of the invention, taken in conjunction with the accompanying drawing in which.

DETAILED DESCRIPTION OF THE INVENTION

Figure 1A:
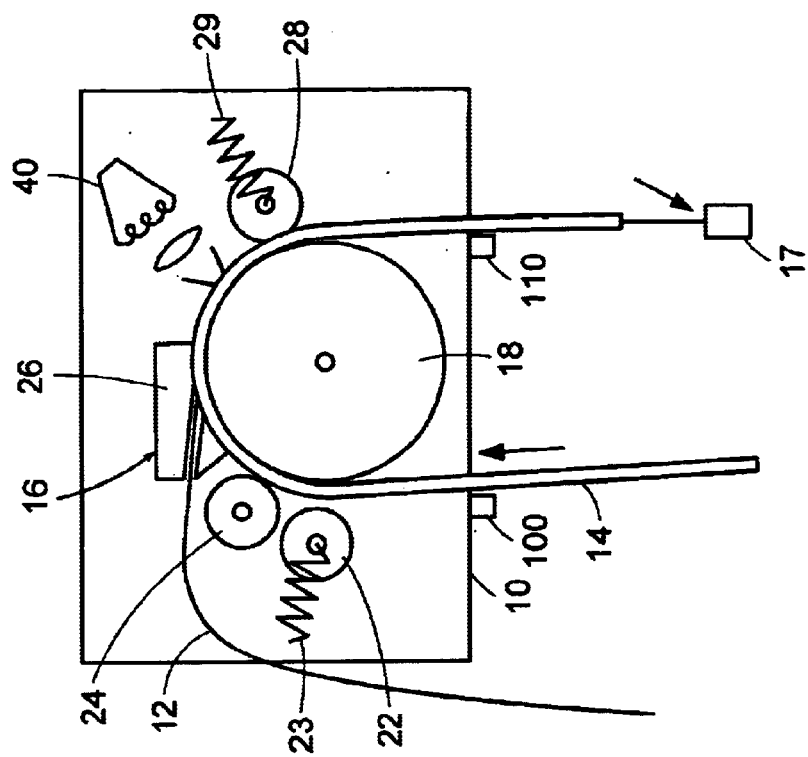
FIGS. 1A and 1B illustrate an apparatus for jacketing a cable according to the present invention.
Figure 1B:
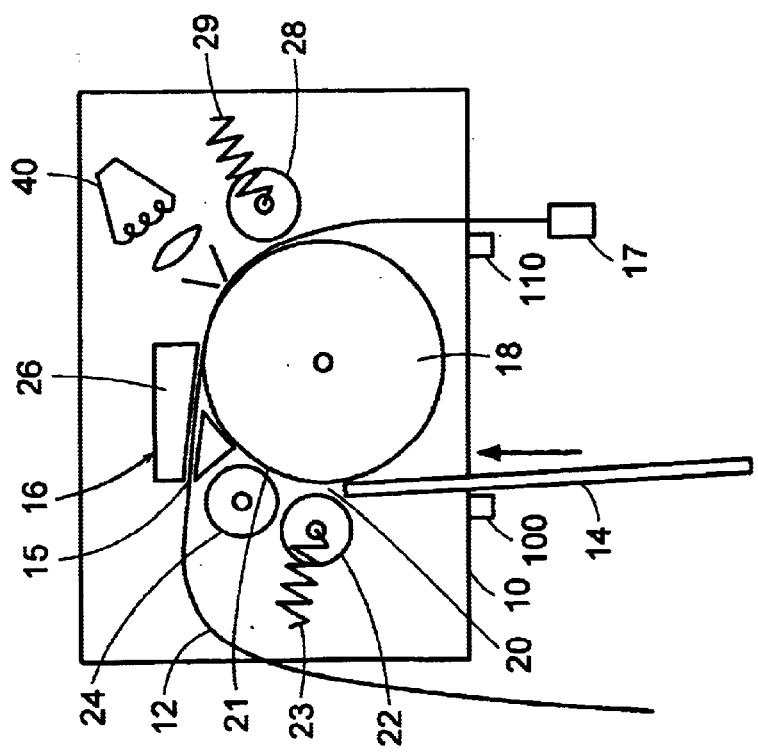

FIGS. 1A and 1B show an illustrative embodiment of an apparatus 10 for automatic insertion of a fiber 12 into protective tubing 14. The terms tubing, jacket, and sleeve are used interchangeably herein and are meant to have the same meaning. Also, the terms wire, cable, and fiber used are interchangeably herein and are meant to have the same meaning. The apparatus 10 can be mounted on a table for easy access. The tubing 14 and fiber 12 are manually loaded onto the apparatus 10 into positions shown in FIG. 1A. The fiber 12 is initially loaded through a fiber insertion slot 15 through the top of the apparatus 10 and through the top of a fixture block 16. This allows a fiber 12 with a ferrule 17 or other terminating assembly to be loaded into the apparatus in that inserting the fiber 12 along insertion slot 15 allows the end of the fiber 12 with the ferrule 17 to be placed outside of the apparatus 10, as shown in FIG. 1. This allows fibers with ferrules 17 or termination assemblies at one or both ends to be used with the present invention.

As shown in FIGS. 1A and 1B, the apparatus includes a friction wheel 18 positioned adjacent to the fixture block 16. The friction wheel 18 may be motorized or not. The friction wheel or roller 18 forms an arc-shaped guiding channel 20 for automatically guiding the protective tubing 14 into a cutting area 21. The arc created by the friction wheel 18 also assists in helping the slit tubing 14 to open up to allow the insertion of the fiber 12. The size of the friction wheel 18 may be changed to assist in helping tubes with different sizes or materials to be properly slit and opened. Alternatively, a plurality of friction wheels 18 may be employed, or a conveyor belt placed over an end wheel may be used to guide the tubing 14 in any appropriate path or arc. Preferably, the friction wheel 18 is made of an elastomeric material, or any hard, rough material such as urethane or knurled steel. After an operator manually loads the tubing 14 into the apparatus 10, pinch roller 22 in cooperation with the friction wheel 18 orient and guide the tubing 14 through the channel 20 into the cutting area 21. A spring 33 applies compressive force to the pinch roller 22 so as to urge the pinch roller 22 towards the friction wheel 18. Two switches 100 and 110 are used to start and stop the motor drive of the friction wheel 18 upon the entering and exiting, respectively, of the tubing 14 into and from the apparatus 10. Alternatively, the apparatus 10 can be operated by a foot pedal (not shown), or set up to automatically start up when a tube 14 is inserted into the apparatus 10.

The cutting area 21 includes a cutter comprising a rotary slitting blade 24 that slits the tubing 14 along it longitudinal axis. The slitting blade does not have to be rotary and can be of any shape or size capable of longitudinally cutting the tubing 14. The fixture block 16 includes a separator/fiber guide 26 that opens the slit formed in the tubing 14 an amount sufficient to allow the fiber 12 to be inserted into the tubing 14. The separator/fiber guide 26 would typically have a plough shape to force the slit open. Alternatively, the tubing 14 may be forced open simply by the arc caused by the friction wheel 18. Alternatively, the splitting blade 24 can be used to hold the slit of the tubing 14 open. Or, the slit of the tubing 14 can be held open with a vacuum. High velocity air jets can be used to create the vacuum.

After the tubing 14 is slit by the slitting blade 24, the fiber 12 and tubing 14 are simultaneously pulled through the fixture block 16, wherein the fiber 12 is inserted into the opening in the tubing 14. A pinch roller 28 is used to help pull the tubing 14 past the slitting blade and through the sealing section. A spring 29 applies compressive force to the pinch roller 28 so as to urge the tubing 14 towards the friction wheel 18. The geometric constraints of the fixture block 16 and the elasticity of tubing 14 cause the tubing 14 to close around the fiber 12. Also, because the tubing 14 is bent into a circular shape in the vicinity of the fixture block 16 by the friction wheel 18, if a slight tension is maintained on the fiber 12, the fiber 12 will be forced away from the slit towards the side of the tubing 14 adjacent to the friction wheel 18, thereby making it easier for the tubing 14 to close around the fiber 12. An additional advantage of the curved path is to assure that the fiber 12, when inserted through the slot 15 and lightly tensioned, will follow the desired guide path inside the apparatus 10. In addition, a solvent or adhesive can be applied to assist in the closing of the tubing 14. Alternatively, the tubing 14 may be closed by adhesive or solvent without the application of heat, or by a mechanical closure such as periodic staples.

Figure 2:
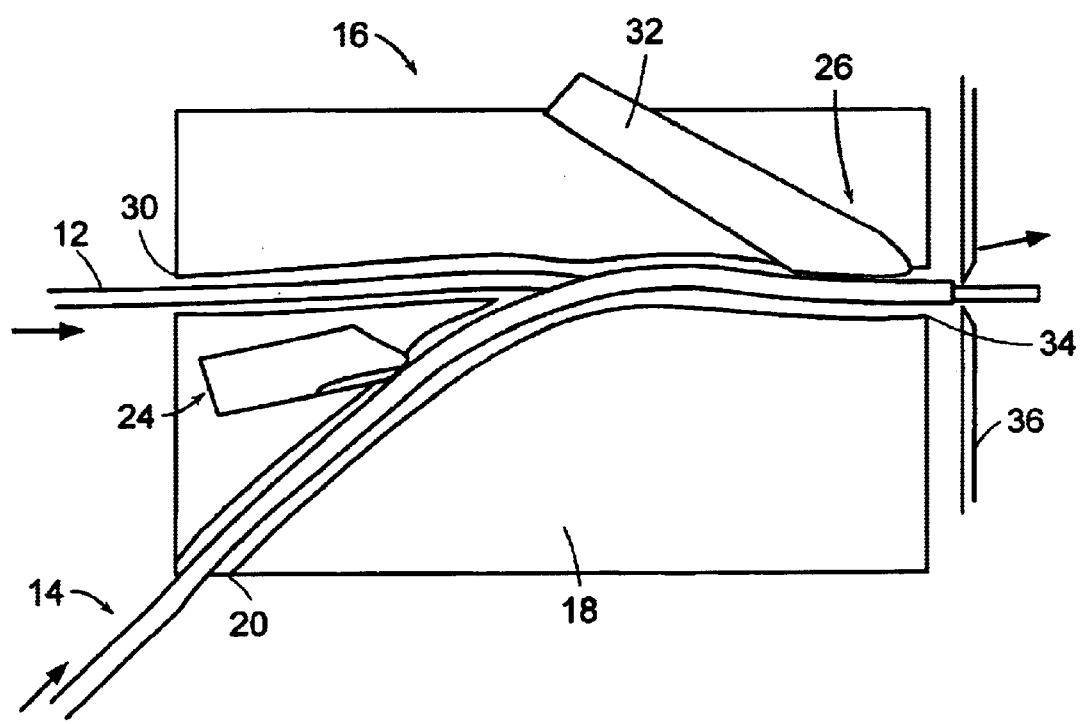
FIG. 2 illustrates the procedure for cutting the tube and inserting the fiber in accordance with one embodiment of the present invention.

FIG. 2 shows a close up view of the slitting procedure according to one embodiment of the present invention. As shown in FIG. 2, the tubing 14 is fed to the slitting blade 24 by friction wheel 18. The fiber 12 enters the fixture block 16 through cavity 30 formed in the fixture block 16. After the tubing 14 is slit, the fiber 12 is inserted therein. In one embodiment, a hot sealing element is used to melt the side of the tube 14 and re-seal it around the fiber 12. The tubing 14, with the fiber 12 enclosed therein, exits the fixture block 16 through opening 34. If necessary, a device 36 may be used to grasp the tube 14 and help pull the fiber and jacket through the apparatus 10. Device 36 includes pinch rollers, an automated grasping tool, or even tweezers.

After the tubing 14 closes around the fiber 12, the tubing 14 is optionally sealed by an infrared heater 40. Other types of heaters, such as a hot solid material, hot air, and radiant heating can be used to seal the tubing 14. The sealing process is precisely controlled to ensure that the re-sealing of the tubing 14 is uniform. After completion of the sealing process, the tubing 14 can be manually removed from the apparatus 10 and coiled back onto an appropriate carrying card. Alternatively, the tubing 14 may be sealed by the application of a sealant such as an adhesive or solvent.

The optical fiber 12 typically has an outside diameter of 250–500 microns. The inner diameter of the protective sleeve (tubing 14) is typically 700–900 microns. Furcation tubing such as Hytrel polyester elastomer tubing made by Dupont Corning Corp. can be used at the protective sleeve. It should be appreciated that the present invention can be applied to other sizes of optical fibers and protective sleeves.

Although the present invention has been described with reference to optical fibers, the invention can be applied to any wire, wherein the term "wire" includes cables, coax ial cables, wire cables and structural cables, tubes within tubes, etc.

The present invention can be used to produce any length of jacketed fiber. Also, the invention can be applied to pre-cut lengths of fibers or tubing, or continuous reels of both. If continuous reels are used, the fiber may be made to extend beyond the tubing.

Although the invention has been shown and described with respect to exemplary embodiments thereof, various other changes, omissions and additions in the form and detail thereof may be made therein without departing from the spirit and scope of the invention. For example, the entire length of the tubing 14 can be slit before the cable is inserted into the tubing 14.

What is claimed is:

1. An apparatus for inserting a cable into a protective jacket comprising:
   a slot for inserting said cable into said apparatus;
   a cutter for making a longitudinal slit in said jacket;
   an insertion area proximate to said slot where said cable is inserted into said slit;
   an arcuate guide path which guides said jacket to said cutter and guides said cable and said jacket through said insertion area; and
   a friction wheel, forming one side of said arcuate guide path, said friction wheel to transport said jacket through said apparatus, wherein said friction wheel maintains contact with said jacket at said cutter, and also at said insertion area.

2. An apparatus as in claim 1, wherein said friction wheel is driven by a motorized mechanism.

3. An apparatus as in claim 1, wherein said friction wheel is made of an elastomeric material.

4. An apparatus as in claim 1, wherein said friction wheel is made of a textured solid material.

5. An apparatus as in claim 1, further including a means for pulling said cable and said jacket out of said apparatus.

6. An apparatus as in claim 1, wherein said cutter is a rotary slitting blade.

7. An apparatus as in claim 1, further including means for closing said slit after said cable is inserted therein.

8. An apparatus as in claim 1, further including a heater proximate said insertion area to apply heat to said jacket after said cable is inserted therein.

9. An apparatus as in claim 1, further including a fixture block for guiding said cable into said insertion area.

10. An apparatus as in claim 9, wherein said fixture block includes a separator that opens said slit for insertion of said cable into said slit.

11. A method of inserting a cable into a protective jacket comprising the steps of:

forming a longitudinal slit in said jacket with a cutter;

inserting said cable into said slit at an insertion area; and transporting and guiding said jacket and said cable in an arcuate guide path using a friction wheel that maintains contact at said cutter with said jacket as said jacket travels past said cutter, and also maintains contact at said insertion area with said jacket as said jacket and said cable travel through said insertion area.

12. A method as in claim 11, wherein said friction wheel is made of an elastomeric material.

13. A method as in claim 11, wherein said cutter is a rotary slitting blade.

14. A method as in claim 11, further including the step of sealing said slit after said cable is inserted wherein.

15. A method as in claim 14, wherein a heater is used in said sealing step.

16. A method as in claim 11, further including the step of holding said slit open during said insertion step.

\* \* \* \* \*